United States Patent
Paddock et al.

(10) Patent No.: US 11,844,359 B2
(45) Date of Patent: Dec. 19, 2023

(54) SQUEEZABLE SPREAD CONTAINING BUTTER AND METHODS OF MAKING THE SAME

(71) Applicant: LAND O'LAKES, INC., Arden Hills, MN (US)

(72) Inventors: Jill K. H. Paddock, Little Canada, MN (US); Allison Hohn, St. Paul, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 94 days.

(21) Appl. No.: 17/474,303

(22) Filed: Sep. 14, 2021

(65) Prior Publication Data

US 2021/0400994 A1    Dec. 30, 2021

Related U.S. Application Data

(62) Division of application No. 16/291,272, filed on Mar. 4, 2019, now Pat. No. 11,140,910.

(60) Provisional application No. 62/638,632, filed on Mar. 5, 2018.

(51) Int. Cl.
   *A23C 15/12*    (2006.01)
   *A23C 15/04*    (2006.01)

(52) U.S. Cl.
   CPC ............ *A23C 15/126* (2013.01); *A23C 15/04* (2013.01); *A23V 2002/00* (2013.01); *A23V 2200/10* (2013.01); *A23V 2200/222* (2013.01); *A23V 2250/042* (2013.01)

(58) Field of Classification Search
   CPC .. A23C 15/126; A23C 15/04; A23V 2002/00; A23V 2200/222; A23V 2200/10; A23V 2250/042

USPC ....... 426/580, 581, 583, 585, 601, 603, 604, 426/613
See application file for complete search history.

(56) References Cited

U.S. PATENT DOCUMENTS

| | | | |
|---|---|---|---|
| 4,177,293 A * | 12/1979 | Forman ................ | A23C 15/165 426/43 |
| 4,769,255 A | 9/1988 | Ahmed et al. | |
| 4,970,087 A | 11/1990 | Admed et al. | |
| 5,756,142 A | 5/1998 | Reckweg et al. | |
| 6,013,303 A | 1/2000 | Reddy et al. | |
| 2007/0212453 A1 * | 9/2007 | Niness ..................... | A23G 3/48 426/601 |
| 2008/0102187 A1 | 5/2008 | Syed | |
| 2008/0102188 A1 | 5/2008 | Syed | |
| 2017/0150732 A1 | 6/2017 | Barratt | |
| 2019/0269147 A1 | 9/2019 | Paddock et al. | |

FOREIGN PATENT DOCUMENTS

| | | |
|---|---|---|
| CA | 2093942 A1 | 11/1993 |
| CA | 2707287 A1 | 10/2010 |
| JP | 2006042782 A | 2/2006 |

OTHER PUBLICATIONS

"Buttermilk Herb Butter" Recipe, Cultures for Health, retrieved from https://www.culturesforhealth.com/learn/recipe/cream-recipes/buttermilk-herb-butter/.
Panchal, et al., "Butter and Dairy Fat Spreads. In: Dairy Fat Products and Functionality", Springer, Cham. https://doi.org/10.1007/978-3-030-41661-4_21, 2020.

* cited by examiner

*Primary Examiner* — Leslie A Wong
(74) *Attorney, Agent, or Firm* — Dorsey & Whitney LLP

(57) ABSTRACT

Butter spreads include at least butter, canola oil, palm oil, cream, and buttermilk powder. The spreads are squeezable from a package and maintain their consistency over repeated package handling and repeated cycling between refrigeration and ambient temperatures.

20 Claims, 5 Drawing Sheets

SQUEEZABLE SPREAD CONTAINING BUTTER AND METHODS OF MAKING THE SAME

CROSS-REFERENCE TO RELATED APPLICATIONS

This application is a divisional of and claims priority to U.S. patent application Ser. No. 16/291,272, filed Mar. 4, 2019, issued as U.S. Pat. No. 11,140,910 on Oct. 12, 2021, entitled "Methods of Making A Squeezable Spread Containing Butter," which in turn claims priority to U.S. Provisional Patent Application No. 62/638,632, filed Mar. 5, 2018, entitled "Squeezable Spread Containing Butter and Methods of Making the Same," both of which are incorporated by reference herein, in their entireties and for all purposes.

FIELD

The present disclosure relates generally to squeezable spreads including butter and methods of producing the same.

BACKGROUND

Consumer interest in healthy and tasty butter and spread products has grown in recent years. Squeezable spreads in particular have gained popularity for their convenience. Many known squeezable spreads are made with emulsified and crystallized vegetable oils along with other additives including natural and artificial flavors. All-vegetable oil spreads are disfavored for their perceived lack of wholesomeness and non-dairy flavor. Butter and dairy flavors are preferred by consumers.

Squeezable spreads have been difficult to formulate with butter due at least in part to the relatively high hard fat content and complex polymorphic behavior of butter. These attributes can lead to texture inconsistencies over time, such as a soft or squeezable product becoming more difficult to spread or squeeze. Known butter-containing squeezable spreads lose their squeezable texture after repeated temperature cycling between refrigeration and ambient temperatures but within their refrigerated storage shelf life. Butter-containing squeezable spreads also exhibit oiling off.

SUMMARY

Some implementations provide methods of making a butter food product. In embodiments, a method of making a butter food product includes preparing an oil fraction including butter, canola oil, palm oil, and an emulsifier. An aqueous fraction including water, cream, buttermilk powder, and at least one preservative is also prepared. The aqueous fraction is added to the oil fraction with continuous agitation. The aqueous fraction and the oil fraction are blended to produce an emulsion, and the emulsion is cooled while continuously agitating the emulsion to form the butter food product.

In embodiments, the cooling is performed in at least a first stage and a second stage. In the first stage, the emulsion may be cooled by about 35° F. to about 95° F. In the second stage, the emulsion may be cooled by about 5° F. to about 45° F. In the first stage, the emulsion may be continuously agitated at about 225 RPM to about 375 RPM. In the second stage, the emulsion may be continuously agitated at about 225 RPM to about 375 RPM.

In embodiments, methods of making a butter food product include packaging the butter food product in a squeezable package. The butter food product may be squeezable and have a vane score of about 400 to about 3000.

In embodiments, the aqueous fraction includes a flavoring agent; the at least one preservative includes salt, potassium sorbate, and lactic acid; and preparing the aqueous fraction includes combining, in the following order, water, cream, buttermilk powder, salt, potassium sorbate, flavoring agent, and lactic acid.

Some implementations provide a squeezable, spreadable food product. In embodiments, the squeezable, spreadable food product includes canola oil, palm oil, butter, and at least one milk product. The palm oil is present at greater than 0.5 weight percent of the squeezable spread. The butter is present at about 7 weight percent to about 18 weight percent of the squeezable spread. The squeezable spread has a vane score of about 400 to about 3000.

In embodiments, the canola oil includes high oleic liquid canola oil and the canola oil is present at about 42 weight percent to about 56 weight percent of the squeezable spread In embodiments, the palm oil includes non-hydrogenated palm oil.

In embodiments, the at least one milk product includes cream and buttermilk powder. The cream may be present at about 2 weight percent to about 15 weight percent of the squeezable spread. The buttermilk powder may be present at about 0.2 weight percent to about 2.0 weight percent of the squeezable spread.

In embodiments, the squeezable spread includes an emulsifier present at about 0.25 weight percent to about 0.45 weight percent of the squeezable spread. The emulsifier may include distilled monoglyceride.

In embodiments, the squeezable spread includes salt present at about 1.0 weight percent to about 2.2 weight percent of the squeezable spread.

In embodiments, the squeezable spread includes potassium sorbate present at about 0.01 weight percent to about 0.20 weight percent of the squeezable spread.

In embodiments, the squeezable spread includes lactic acid present at about 0.25 weight percent to about 0.35 weight percent of the squeezable spread.

In embodiments, the squeezable, spreadable food product includes a total fat content of about 63 weight percent to about 71 weight percent of the squeezable spread, a milkfat content of about 10 weight percent to about 18 weight percent of the squeezable spread, a moisture content of about 24 weight percent to about 32 weight percent of the squeezable spread, and a salt content of about 1.0 weight percent to about 2.2 weight percent of the squeezable spread. The squeezable spread has a vane score of about 400 to about 3000.

In embodiments, the milkfat is derived at least in part from butter and cream.

In embodiments, the squeezable spread has a pH of about 5.0 to about 6.0.

In embodiments, the squeezable spread includes a potassium sorbate content of about 0.01 weight percent to about 0.20 weight percent of the squeezable spread.

DETAILED DESCRIPTION

Figure 1A:
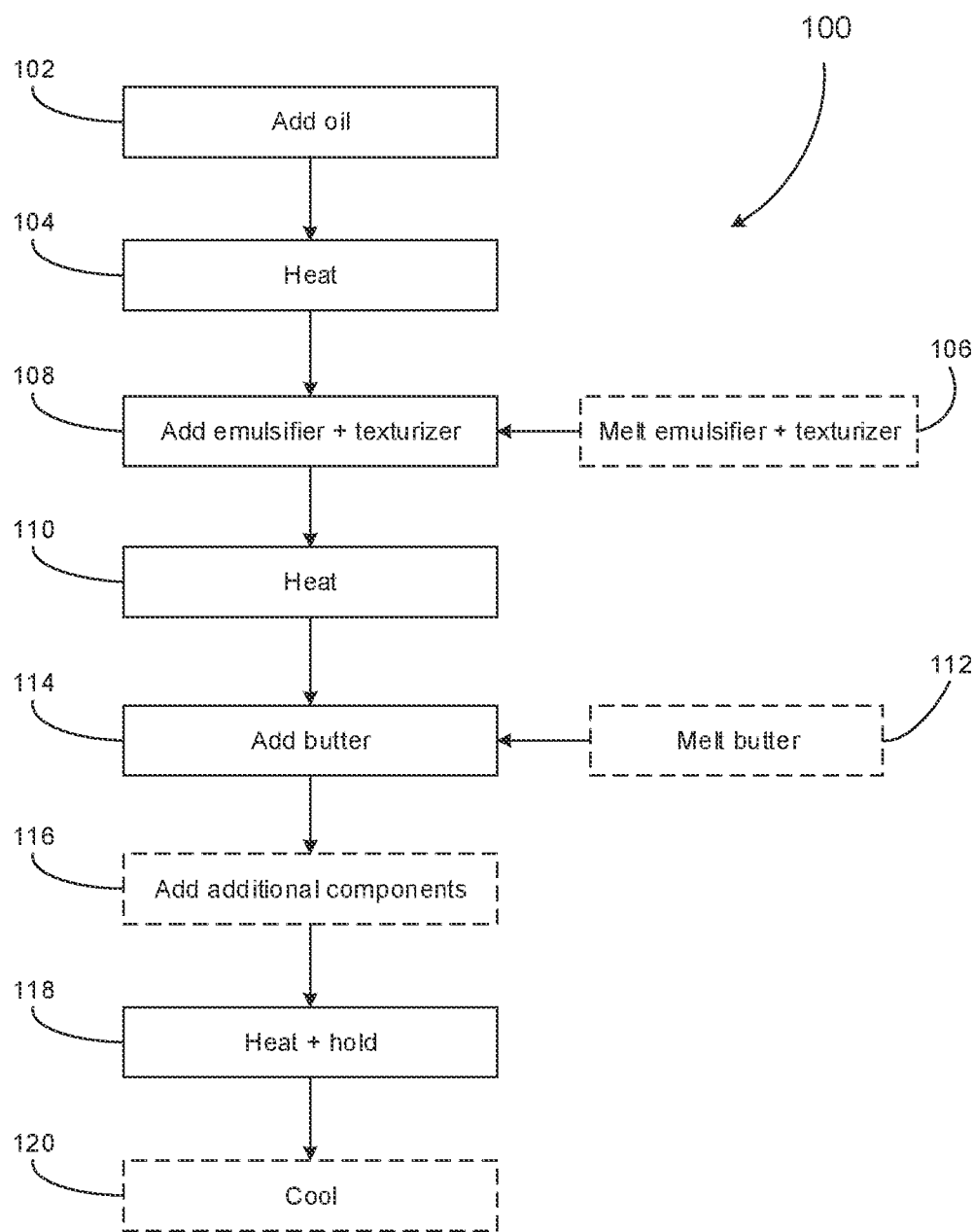
FIGS. 1A and 1B are a flow diagrams of oil phase preparation methods according to embodiments.

Food spreads including butter are disclosed herein. The butter spreads may be squeezable from a container in which they have been packaged, may withstand cycling between refrigeration and ambient temperatures, may have taste attributes of butter, may have aroma attributes of butter, and/or may have spreading attributes of butter.

The butter spreads may be fat continuous spreads (water-in-oil). The spreads may be generally understood as containing an emulsion of an oil fraction and an aqueous fraction and may be referred to a water-in-oil emulsion. The oil fraction includes butter.

Butter Spread Formulations

Butter spreads may be generally understood as a composition including butter and a plurality of additional components. The composition may additionally include a vegetable oil, an emulsifier, a texturizer, water, at least one dried or liquid milk product, at least one preservative, at least one flavoring agent, and a processing aid. Any given component may serve more than one function.

The term "butter" may be used herein in accordance with labeling requirements of regulatory authorities in the United States, such as the United States Department of Agriculture (U.S.D.A.), in which butter has a particularized definition in that it is made exclusively from milk and/or cream and may contain additional coloring matter and salt. In addition, under the U.S.D.A. regulations, butter may not contain less than 80 weight percent milkfat (also referred to as butterfat). In addition to containing about 80 weight percent milkfat (e.g., from about 80 to 85 weight percent or from about 80 to 81 weight percent), the butter derived from cream or milk contains about 1 to 5 or about 3 to 5 percent solids non-fat (e.g., protein, lactose, salt and combinations thereof), a total solids content of between 83 to about 85 percent, and about 14 to 18 percent or preferably about 15 to 17 percent moisture.

Butter may be present at about 7 weight percent to about 18 weight percent of a butter spread, or about 7 weight percent to about 16 weight percent, about 7 weight percent to about 14 weight percent, about 7 weight percent to about 12 weight percent, about 8 weight percent to about 18 weight percent, about 10 weight percent to about 18 weight percent, about 12 weight percent to about 18 weight percent, about 14 weight percent to about 18 weight percent, about 10 weight percent to about 15 weight percent, or about 15 weight percent of the butter spread.

In some embodiments, such as for butter spreads that include liquid cream as described below, butter may be present at less than about 7 weight percent or less than about 4 weight percent, or butter may not be included (0 weight percent).

In the implementations and use of a butter spread, butter may help produce a crystal structure in an emulsified spread. Butter may also help produce a product with a color, taste, creaminess, and/or hardness that is desirable to consumers.

The vegetable oil may be canola oil. In one embodiment, the canola oil is high-oleic liquid canola oil. High-oleic canola oil may contain a greater percentage of monounsaturated fats, such as oleic acid, and/or a lower percentage of polyunsaturated fats, such as alpha-linolenic acid and linoleic acid, than canola oil. The saturated fat profile of high-oleic canola oil may be approximately the same as that of canola oil.

The oil may be present at about 42 weight percent to about 56 weight percent of a butter spread, or about 42 weight percent to about 54 weight percent, about 42 weight percent to about 52 weight percent, about 42 weight percent to about 50 weight percent, about 42 weight percent to about 48 weight percent, about 44 weight percent to about 56 weight percent, about 46 weight percent to about 56 weight percent, about 48 weight percent to about 56 weight percent, about 42 weight percent to about 50 weight percent, about 47 weight percent to about 52 weight percent, or about 51 weight percent of the butter spread.

In the implementations and use of a butter spread, high-oleic canola oil may help produce a spread with an extended shelf life, such as in comparison to using soybean oil. Canola oil may help produce an improved crystal structure in an emulsified spread.

The emulsifier may be any substance that stabilizes an emulsion. In one embodiment, the emulsifier is distilled monoglyceride(s), such as soft distilled monoglyceride(s).

The emulsifier may be present at about 0.25 weight percent to about 0.45 weight percent of a butter spread, or about 0.25 weight percent to about 0.40 weight percent, about 0.25 weight percent to about 0.35 weight percent, about 0.25 weight percent to about 0.30 weight percent, about 0.30 weight percent to about 0.45 weight percent, about 0.35 weight percent to about 0.45 weight percent, about 0.40 weight percent to about 0.45 weight percent, about 0.30 weight percent to about 0.36 weight percent, or about 0.33 weight percent of the butter spread.

In the implementations and use of a butter spread, the emulsifier may help to produce a stable water-in-oil emulsion.

Butter spreads disclosed herein include at least one texturizer. The texturizer may be any substance that changes the texture of a butter spread, such as by increasing or decreasing creaminess, thickness, and/or viscosity. In one embodiment, the texturizer is palm oil. In one embodiment, the palm oil is non-hydrogenated palm oil. In one embodiment, a texturizer is xanthan gum.

The texturizer may be present at greater than 0.5 weight percent of a butter spread, such as about 0.6 weight percent to about 2.0 weight percent, about 0.6 weight percent to about 1.75 weight percent, about 0.6 weight percent to about 1.5 weight percent, about 0.6 weight percent to about 1.25 weight percent, about 0.6 weight percent to about 1.0 weight percent, about 0.75 weight percent to about 2.0 weight percent, about 1.0 weight percent to about 2.0 weight percent, about 1.5 weight percent to about 2.0 weight percent, about 1.3 weight percent to about 1.7 weight percent, or about 1.5 weight percent of the butter spread.

In the implementations and use of a butter spread, the texturizer may help to produce a stable water-in-oil emulsion. The texturizer may help to reduce or prevent oil separation, such as that which occurs from cycling between refrigeration and ambient temperatures and/or from physical manipulation of a spread in a package over the course of the spread's shelf life. The texturizer may help to produce a butter spread with a desirable creamy texture and consistency. Without being limited to any mechanism or mode of action, the texturizer may provide these and other benefits by aiding in crystal structure development and/or excess oil entrapment in an emulsified spread.

Water may be present at about 21 weight percent to about 28 weight percent of a butter spread, or about 21 weight percent to about 28 weight percent, about 21 weight percent to about 26 weight percent, about 21 weight percent to about 24 weight percent, about 23 weight percent to about 28 weight percent, about 25 weight percent to about 28 weight percent, about 23 weight percent to about 25 weight percent, or about 25 weight percent of the butter spread.

In some embodiments, butter spreads include liquid cream. As used herein, the term "cream" refers to dry cream or liquid cream. Liquid cream may not be present (0 weight percent) or may be present at about 1 weight percent to about 40 weight percent of the butter spread, about 1 weight percent to about 35 weight percent, about 1 weight percent to about 30 weight percent, about 1 weight percent to about 25 weight percent, about 1 weight percent to about 20 weight percent, about 1 weight percent to about 15 weight percent, about 1 weight percent to about 10 weight percent, about 10 weight percent to about 40 weight percent, about 15 weight percent to about 40 weight percent, about 20 weight percent to about 40 weight percent, about 25 weight percent to about 40 weight percent, about 30 weight percent to about 40 weight percent, about 10 weight percent to about 20 weight percent, or about 16 weight percent of the butter spread.

In some implementations, a butter spread includes liquid cream and the amount of butter is reduced compared to formulations that do not include liquid cream. In some implementations, a butter spread includes liquid cream and the amount of water is reduced compared to formulations that do not include liquid cream.

Dried milk products may be milk or any component thereof that has been fully or partially dried. In one embodiment, butter spreads include one or both of dry cream and buttermilk powder or sweet cream buttermilk powder.

Dry cream may be present at about 2 weight percent to about 15 weight percent of a butter spread, or about 2 weight percent to about 13 weight percent, about 2 weight percent to about 11 weight percent, about 2 weight percent to about 9 weight percent, about 2 weight percent to about 7 weight percent, about 2 weight percent to about 5 weight percent, about 4 weight percent to about 15 weight percent, about 6 weight percent to about 15 weight percent, about 8 weight percent to about 15 weight percent, about 10 weight percent to about 15 weight percent, about 3 weight percent to about 4 weight percent, or about 3.5 percent of the butter spread.

Buttermilk powder may be present at about 0.2 weight percent to about 2.0 weight percent of a butter spread, or about 0.2 weight percent to about 1.75 weight percent, about 0.2 weight percent to about 1.5 weight percent, about 0.2 weight percent to about 1.0 weight percent, about 0.2 weight percent to about 0.75 weight percent, about 0.5 weight percent to about 2.0 weight percent, about 0.75 weight percent to about 2.0 weight percent, about 1.0 weight percent to about 2.0 weight percent, about 1.25 weight percent to about 2.0 weight percent, about 1.75 weight percent to about 2.0 weight percent, about 1.6 weight percent to about 1.8 weight percent, or about 1.7 weight percent of a butter spread.

In the implementations and use of a butter spread, dried and liquid milk products may provide milkfat and/or flavor to butter spreads. Dried and liquid milk products may enhance the aqueous phase of an emulsified spread. The use of cream and sweet cream buttermilk powder, instead of nonfat dry milk, may enhance the emulsion strength. Without being limited to any mechanism or mode of action, milk phospholipids in cream and/or sweet cream buttermilk powder may act in synergy with the emulsifier. In the implementations and use of a butter spread, cream may help produce a crystal structure in an emulsified spread.

Preservatives may be any substance that helps to prevent decomposition of a butter spread, such as by microbial growth or by undesirable chemical changes. In one embodiment, butter spreads include one or more of salt, potassium sorbate, and lactic acid.

Salt may be present at about 1.0 weight percent to about 2.2 weight percent of a butter spread, or about 1.0 weight percent to about 2.0 weight percent, about 1.0 weight percent to about 1.75 weight percent, about 1.0 weight percent to about 1.5 weight percent, about 1.0 weight percent to about 1.25 weight percent, about 1.25 weight percent to about 2.2 weight percent, about 1.5 weight percent to about 2.2 weight percent, about 1.75 weight percent to about 2.2 weight percent, about 1.0 weight percent to about 1.5 weight percent, about 1.5 weight percent to about 1.75 weight percent, or about 1.4 weight percent of the butter spread.

Potassium sorbate may not be included (0 weight percent) in a butter spread, or may be present at about 0.01 weight percent to about 0.20 weight percent of a butter spread, or about 0.01 weight percent to about 0.15 weight percent, about 0.01 weight percent to about 0.10 weight percent, about 0.01 weight percent to about 0.05 weight percent, about 0.05 weight percent to about 0.20 weight percent, about 0.10 weight percent to about 0.20 weight percent, about 0.15 weight percent to about 0.20 weight percent, about 0.14 weight percent to about 0.16 weight percent, or about 0.15 weight percent of the butter spread.

Lactic acid may be present at about 0.25 weight percent to about 0.35 weight percent of a butter spread, or about 0.25 weight percent to about 0.33 weight percent, about 0.25 weight percent to about 0.31 weight percent, about 0.25 weight percent to about 0.29 weight percent, about 0.27 weight percent to about 0.35 weight percent, about 0.29 weight percent to about 0.35 weight percent, about 0.31 weight percent to about 0.35 weight percent, or about 0.25 weight percent of the butter spread.

In the implementations and use of a butter spread, preservatives may help extend the shelf life of the butter spread. Preservatives such as lactic acid may help to achieve a desired butter spread pH that helps to prevent microbial growth. Lactic acid may also provide a desired tart or sour flavor. Salt may help produce a product with sensory appeal.

Flavoring agents may be any substance that helps a butter spread achieve a desired taste. Flavoring agents may be aqueous or oil soluble. Examples of flavoring agents include dairy flavors.

Flavoring agents may not be included (0 weight percent) in a butter spread, or may be present at about 0.01 weight percent to about 0.20 weight percent of a butter spread, or about 0.01 weight percent to about 0.15 weight percent, about 0.01 weight percent to about 0.10 weight percent, about 0.01 weight percent to about 0.05 weight percent, about 0.05 weight percent to about 0.20 weight percent, about 0.10 weight percent to about 0.20 weight percent, about 0.15 weight percent to about 0.20 weight percent, about 0.10 weight percent to about 0.12 weight percent, about 0.04 weight percent to about 0.06 weight percent, about 0.11 weight percent, or about 0.05 weight percent of the butter spreads.

In the implementations and use of a butter spread, flavoring agents may add a desirable flavor to the butter spread.

Butter spreads disclosed herein may include one or more processing aids. In one embodiment, a processing aid is a de-foamer. The de-foamer may be mineral oil emulsion-based and/or may not include silicone.

The de-foamer may not be included (0 weight percent) in a butter spread, or may be present at about 0.002 weight percent to about 0.005 weight percent of a butter spread, or about 0.002 weight percent to about 0.004 weight percent, about 0.002 weight percent to about 0.003 weight percent, about 0.003 weight percent to about 0.005 weight percent, about 0.004 weight percent to about 0.005 weight percent, about 0.003 weight percent to about 0.004 weight percent, or about 0.0038 weight percent of the butter spreads.

Butter spreads may also include one or more coloring agents. Coloring agents may be any substance that helps produce a butter spread with a desirable or appealing color.

Coloring agents may not be included (0 weight percent) in a butter spread, or may be present at about 0.01 weight percent to about 0.20 weight percent of a butter spread, or about 0.01 weight percent to about 0.15 weight percent, about 0.01 weight percent to about 0.10 weight percent, about 0.01 weight percent to about 0.05 weight percent, about 0.05 weight percent to about 0.20 weight percent, about 0.10 weight percent to about 0.20 weight percent, about 0.15 weight percent to about 0.20 weight percent, about 0.10 weight percent to about 0.12 weight percent, or about 0.11 weight percent of the butter spreads.

The butter spread may exclude one or more components of known spreads. For example, the butter spread may not include partially hydrogenated oil. The butter spread may not include polyglycerol esters of fatty acids (PGFAs).

Butter spreads formulations include fats, proteins, moisture, and other components. Butter spreads may have a total fat content of about 63 weight percent to about 71 weight percent of the butter spread, or about 63 weight percent to about 69 weight percent, about 63 weight percent to about 67 weight percent, about 65 weight percent to about 71 weight percent, about 67 weight percent to about 71 weight percent, about 69 weight percent to about 71 weight percent, or about 66 weight percent to about 68 weight percent of the butter spread.

The butter spread may not be a butter because it may not meet the U.S.D.A. labeling requirements for butter. As described above, butter may not contain less than 80 weight percent milkfat. The fat content of the presently disclosed butter spread may be too low to meet the labeling requirements for butter.

The butter spread may not be a margarine because it may not meet the U.S.D.A. labeling requirements for margarine. For example, under U.S.D.A. regulations, margarine may not contain less than 80 weight percent fat. The fat content of the presently disclosed butter spread may be too low to meet the labeling requirements for margarine.

The fat content of the presently disclosed butter spread may be too high to be considered a "reduced-fat" spread or a "low-fat" spread. A reduced-fat spread includes at most 60 weight percent fat. A low-fat spread includes at most 40 weight percent fat. A reduced-fat or low-fat spread may include water and/or polyglycerol esters of fatty acids to help replace the fat content. The presently disclosed butter spreads may have a lower water content than either of a reduced-fat or a low-fat spread. The presently disclosed butter spreads may not include polyglycerol esters of fatty acids.

Some of the fat in a butter spread may be provided as milkfat, such as from butter, cream, and/or buttermilk powder. Butter includes about 80 weight percent fat. Cream includes about 40 weight percent fat. Buttermilk powder includes about 5.8 weight percent fat. Butter spreads may have a milkfat content of about 10 weight percent to about 18 weight percent of the butter spread, or about 10 weight percent to about 16 weight percent, about 10 weight percent to about 14 weight percent, about 10 weight percent to about 12 weight percent, about 12 weight percent to about 18 weight percent, about 14 weight percent to about 18 weight percent, or about 13 weight percent to about 14 weight percent of the butter spread.

In the implementations and use of a butter spread, dairy fats may solidify such that a higher amount of fat contributed by dairy fats helps produce a spread with a firmer texture compared to a spread having a lower amount of fat contributed by dairy fats.

Butter spreads may have a protein content of less than about 1.0 weight percent of the butter spread, about 1.0 weight percent to about 1.7 weight percent, about 1.0 weight percent to about 1.6 weight percent, about 1.0 weight percent to about 1.5 weight percent, about 1.0 weight percent to about 1.4 weight percent, about 1.0 weight percent to about 1.3 weight percent, about 1.0 weight percent to about 1.2 weight percent, about 1.1 weight percent to about 1.7 weight percent, about 1.2 weight percent to about 1.7 weight percent, about 1.3 weight percent to about 1.7 weight percent, about 1.4 weight percent to about 1.7 weight percent, about 1.5 weight percent to about 1.7 weight percent, about 1.3 weight percent to about 1.5 weight percent, or about 1.4 weight percent of the butter spread.

The protein may be contributed by, for example, cream or buttermilk powder. In one example, the butter spread includes dry cream, which includes about 22 weight percent protein, and the dry cream contributes about 0.77 weight percent protein of the butter spread. In one example, the butter spread includes buttermilk powder, which includes about 34 weight percent protein, and the buttermilk powder contributes about 0.6 weight percent protein of the butter spread.

Butter spreads may have a moisture content of about 24 weight percent to about 32 weight percent of the butter spread, or about 24 weight percent to about 30 weight percent, about 24 weight percent to about 28 weight percent, about 26 weight percent to about 32 weight percent, about 28 weight percent to about 32 weight percent, or about 27 weight percent to about 29 weight percent of the butter spread.

Butter spreads may have a salt content of about 1.0 weight percent to about 2.2 weight percent of the butter spread, or about 1.0 weight percent to about 2.0 weight percent, about 1.0 weight percent to about 1.75 weight percent, about 1.0 weight percent to about 1.5 weight percent, about 1.0 weight percent to about 1.25 weight percent, about 1.25 weight percent to about 2.2 weight percent, about 1.5 weight percent to about 2.2 weight percent, about 1.75 weight percent to about 2.2 weight percent, about 1.0 weight percent to about 1.5 weight percent, about 1.5 weight percent to about 1.75 weight percent, or about 1.4 weight percent of the butter spread.

Butter spreads may not include potassium sorbate or may have a potassium sorbate content of about 0.01 weight percent to about 0.20 weight percent of a butter spread, or about 0.01 weight percent to about 0.15 weight percent, about 0.01 weight percent to about 0.10 weight percent, about 0.01 weight percent to about 0.05 weight percent, about 0.05 weight percent to about 0.20 weight percent, about 0.10 weight percent to about 0.20 weight percent, about 0.15 weight percent to about 0.20 weight percent, about 0.14 weight percent to about 0.16 weight percent, or about 0.15 weight percent of the butter spread.

Butter spreads may have a pH of about 5.0 to about 6.0, about 5.0 to about 5.8, about 5.0 to about 5.6, about 5.0 to about 5.4, about 5.2 to about 6.0, about 5.4 to about 6.0, about 5.6 to about 6.0, or about 5.2 to about 5.5.

Salt-in-moisture levels are a measure of microbial safety. Butter spreads may have a salt-in-moisture level greater than 5, such as about 5.5.

Butter spreads may be any one or more of spreadable; squeezable; have a desired texture, such as smooth and/or creamy; and/or have a desired firmness. The butter spreads may maintain any one or more of these characteristics during the product shelf life. The shelf life may be about 6 months to about 9 months.

For example, and as described in more detail in Example 2 below, butter spreads may be squeezable and may remain squeezable over the course of their shelf lives. Vane scores may be used as a measure of squeezability and a squeezable product may be one with a vane score of less than about 3000. The butter spreads may have a vane score of about 400 to about 3000, about 400 to about 2500, about 400 to about 2000, about 400 to about 1500, about 400 to about 1000, about 400 to about 750, about 500 to about 3000, about 750 to about 3000, about 1000 to about 3000, about 1500 to about 3000, about 2000 to about 3000, about 2500 to about 3000, or about 800 to about 2200.

As another example, and as described in more detail in Example 4 below, viscosity may be used as a measure of squeezability. Butter spreads may have a viscosity of about 500,000 cP to 1,800,000 cP, about 500,000 cP to 1,600,000 cP, about 500,000 cP to 1,400,000 cP, about 500,000 cP to 1,200,000 cP, about 500,000 cP to 1,000,000 cP, about 500,000 cP to 800,000 cP, about 700,000 cP to 1,800,000 cP, about 900,000 cP to 1,800,000 cP, about 1,100,000 cP to 1,800,000 cP, about 1,300,000 cP to 1,800,000 cP, or about 1,500,000 cP to 1,800,000 cP.

Butter spreads may be squeezable at both refrigerated and ambient temperatures and/or may be spreadable at both refrigerated and ambient temperatures. These features are in contrast to some products, such as a butter stick, that are not squeezable or spreadable at refrigerated temperatures. Butter spreads may not be liquid at either refrigerated or ambient temperatures. This feature is in contrast to some products, such as butter-like products, that are liquid at least at ambient temperatures.

Methods of Making Butter Spreads

Figure 2:
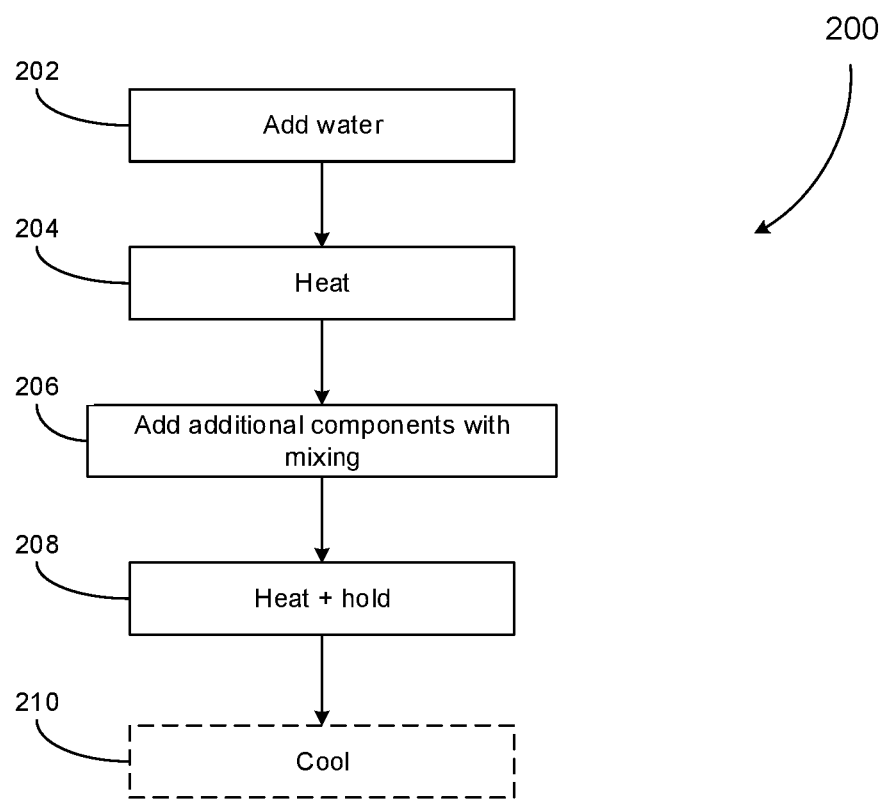
FIG. 2 is a flow diagram of an aqueous phase preparation method according to one embodiment.
Figure 3:
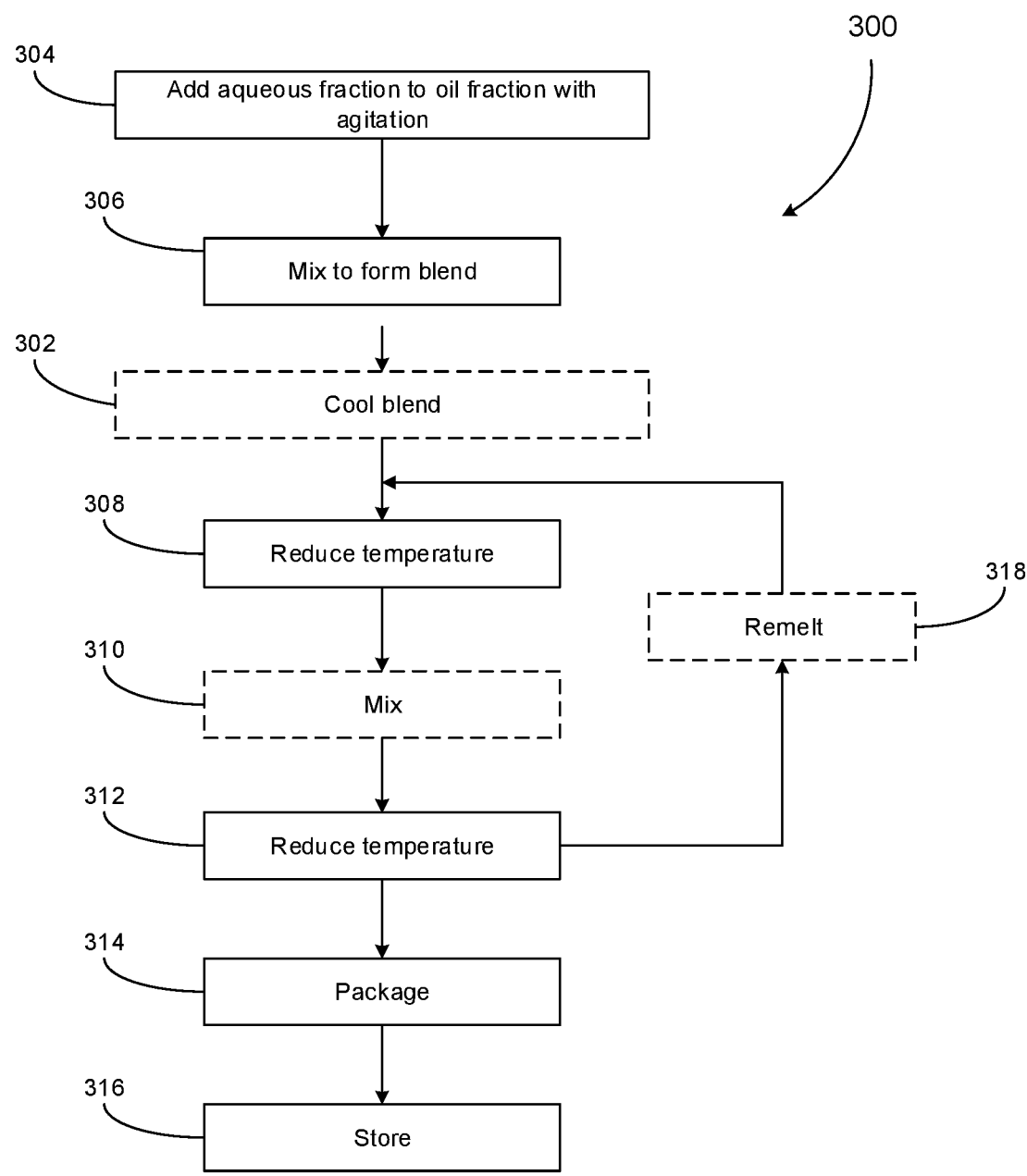
FIG. 3 is a flow diagram of a butter spread preparation method according to one embodiment.

The presently disclosed butter spreads may be produced by preparing each of an oil fraction and an aqueous fraction and then combining the two fractions to form a blend, which may be an emulsion, such as a water-in-oil emulsion. FIGS. 1-3 illustrate various aspects of methods of preparing the disclosed butter spreads. The methods of FIGS. 1-3 may be performed sequentially, contemporaneously, separately, together, or any combination thereof.

With reference to FIG. 1A, a method 100 of preparing an oil fraction or phase of a butter spread includes a step 102 of adding oil to a vessel; a step 104 of heating the oil; a step 108 of adding an emulsifier and a texturizer to the vessel; a step 110 of heating the oil, emulsifier, and texturizer; a step 114 of adding butter to the vessel; and a step 118 of heating the oil fraction and holding it at a desired temperature. In some embodiments, the method 100 includes one or more of a step 106 of melting the emulsifier and texturizer; a step 112 of melting the butter; a step 116 of adding additional components; and a step 120 of cooling the oil fraction.

In step 102, the oil may be vegetable oil, such as canola oil. In one embodiment, the canola oil is high-oleic liquid canola oil. The vessel may be a tank or kettle. The vessel may include a water jacket for temperature regulation.

In step 104, the oil may be heated to about 130° F. to about 145° F., about 130° F. to about 140° F., about 130° F. to about 135° F., about 135° F. to about 145° F., or about 140° F. to about 145° F. The temperature to which the oil is heated may be influenced by whether the vessel includes all or a portion (see optional step 106 below) of the total volume of oil. For example, when step 106 is not included in the method 100, the oil may be heated to about 145° F. When step 106 is included in the method 100, the oil may be heated to about 130° F.

With continued reference to FIG. 1A, in step 108, the emulsifier and texturizer are added to the vessel containing the oil heated in step 104. The emulsifier may be distilled monoglyceride(s), such as soft distilled monoglyceride(s). The texturizer may be, for example, palm oil. In one embodiment, the palm oil is non-hydrogenated palm oil.

In optional step 106, the emulsifier and texturizer are melted before they are added to the bulk of the oil. When step 106 is included in the method 100, some of the oil is reserved instead of being added to the vessel in step 102. The reserved oil may be heated to about 145° F. to about 155° F. and then the emulsifier and texturizer are added to the heated oil. Once the emulsifier and texturizer are melted, which may be completely melted, the blend is transferred to the bulk of the oil, which has been heated to about 130° F. in step 104.

In step 110, the oil blend may be heated to at least 140° F., such as about 140° F. to about 155° F., about 145° F. to about 155° F., about 140° F. to about 150° F., or about 150° F. Heat may be applied until the oil blend is heated throughout or until the oil blend is a homogenous mixture. The oil blend may be heated for at least 5 minutes, such as about 5 minutes to about 25 minutes, about 5 minutes to about 20 minutes, about 5 minutes to about 15 minutes, about 5 minutes to about 10 minutes, about 10 minutes to about 25 minutes, about 15 minutes to about 25 minutes, or about 20 minutes to about 25 minutes.

With continued reference to FIG. 1A, in step 114, butter is added to the oil blend. The butter may be added as a solid and allowed to melt. Alternatively, as shown in optional step 112, solid butter may be melted first and then transferred as a liquid to the vessel containing the oil blend. Performing step 114 after step 108 may help produce a better quality emulsion. For example, the butter carries water with it, which may affect emulsion formation.

In optional step 116, additional components may be added. Additional components may include one or more of canola lecithin, artificial flavors, natural flavors, and color. The step 116 may also include mixing the components for a period of time, such as about 5 minutes to about 10 minutes, about 5 minutes to about 8 minutes, or about 7 minutes to about 10 minutes.

In step 118, the oil blend is heated, such as to about 144° F. to about 153° F., about 144° F. to about 151° F., about 144° F. to about 149° F., about 146° F. to about 153° F., or about 148° F. to about 153° F. In some implementations, the oil blend is heated to about 147° F. to about 150° F., or to about 150° F. The temperature may be held for a desired amount of time, such as about 30 seconds, about 45 seconds, about 60 seconds, about 75 seconds, about 90 seconds, about 105 seconds, or about 120 seconds.

With continued reference to FIG. 1A, in optional step 120, the oil blend may be cooled, such as to about 105° F. to about 130° F., about 105° F. to about 125° F., about 105° F. to about 120° F., about 105° F. to about 115° F., about 110° F. to about 130° F., about 115° F. to about 130° F., or about 120° F. to about 130° F. In some implementations, the oil blend is cooled to about 110° F. to about 120° F., or to about 115° F. Cooling may be performed by circulating, through a jacket of the vessel, water having a temperature less than the temperature of the oil blend at the end of step 118. When step 120 is included in the method 100, it may help to reduce or prevent protein denaturation and/or lessen the demand on equipment in downstream steps.

Figure 1B:
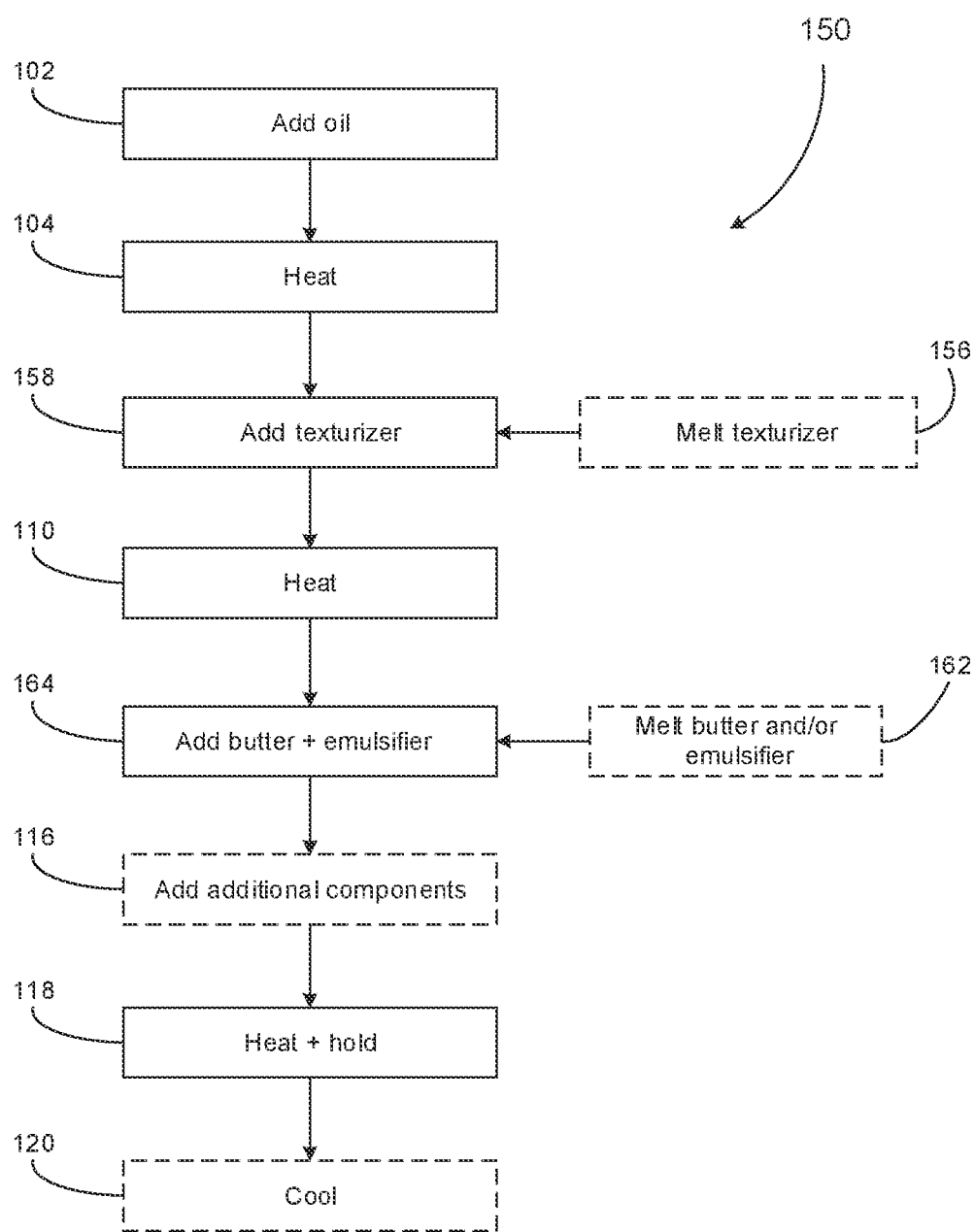

With reference to FIG. 1B, a method 150 of preparing an oil fraction or phase of a butter spread includes a step 102 of adding oil to a vessel; a step 104 of heating the oil; a step 158 of adding a texturizer to the vessel; a step 110 of heating the oil and texturizer; a step 164 of adding butter and an emulsifier to the vessel; and a step 118 of heating the oil fraction and holding it at a desired temperature. In some embodiments, the method 150 includes one or more of a step 156 of melting the texturizer; a step 162 of melting the butter and/or emulsifier; a step 116 of adding additional components; and a step 120 of cooling the oil fraction.

Steps 102, 104, 110, 116, 118, and 120 of method 150 are as described above for the like-numbered steps 102, 104, 110, 116, 118, and 120, respectively, of method 100.

With reference again to FIG. 1B, in step 158, the texturizer is added to the vessel containing the oil heated in step 104. The texturizer may be, for example, palm oil. In one embodiment, the palm oil is non-hydrogenated palm oil. Step 158 is similar to step 108 of method 100 except the emulsifier is not added with the texturizer.

In optional step 156, the texturizer is melted before it is added to the bulk of the oil. When step 156 is included in the method 100, some of the oil is reserved instead of being added to the vessel in step 102. The reserved oil may be heated to about 145° F. to about 155° F. and then the texturizer is added to the heated oil. Once the texturizer is melted, which may be completely melted, the texturizer is transferred to the bulk of the oil, which has been heated to about 130° F. in step 104. Step 156 is similar to step 106 of method 100 except the emulsifier is not melted with the texturizer.

With continued reference to FIG. 1B, in step 164, butter and emulsifier are added to the oil blend. The emulsifier may be distilled monoglyceride(s), such as soft distilled monoglyceride(s). Either or both of the emulsifer and butter may be added as a solid and allowed to melt. Alternatively, as shown in optional step 162, solid butter and/or emulsifer may be melted first and then transferred as a liquid to the vessel containing the oil blend.

With reference to FIG. 2, a method 200 of preparing an aqueous fraction or phase of the butter spread includes a step 202 of adding water to a vessel; a step 204 of heating the water; a step 206 of adding additional aqueous fraction components while mixing them; and a step 208 of heating the aqueous fraction and holding it at a desired temperature. In some embodiments, the method 200 includes a step 210 of cooling the aqueous fraction.

In step 202, the vessel may be a tank or kettle. The vessel may include a water jacket for temperature regulation. In some embodiments, liquid cream is added to the vessel instead of or in addition to the water.

In step 204, the water is heated to at least about 120° F., such as about 120° F. to about 170° F., about 120° F. to about 160° F., about 120° F. to about 150° F., about 120° F. to about 140° F., about 120° F. to about 130° F., about 130° F. to about 170° F., about 140° F. to about 170° F., about 150° F. to about 170° F., or about 160° F. to about 170° F.

With continued reference to FIG. 2, in step 206, the remaining aqueous phase components are added, in the presence of mixing, to the vessel containing the heated water. Mixing may be high shear agitation. The components may include one or more of dried milk products, preservatives, flavoring agents, texturizers, and de-foamer. The dried milk products may include one or more of dry cream and buttermilk powder. The preservatives may include one or more of salt, potassium sorbate, and lactic acid. In one implementation, the components include cream, buttermilk powder, salt, potassium sorbate, and lactic acid. The components may be added in the order recited, which may help hydrate dairy proteins before the addition of the lactic acid. Hydrating proteins before the addition of acid may reduce or prevent curdling or denaturing of the proteins. In some embodiments, a texturizer, such as xanthan gum, is added immediately after addition of the potassium sorbate. The pH of the resulting aqueous blend may be about 4.6 to about 5.3, such as about 4.6 to about 5.0.

In step 208, the aqueous blend is heated throughout to at least 165° F. throughout, such as about 165° F. to about 175° F., about 165° F. to about 170° F., or about 165° F. to about 168° F. The temperature may be held for a desired amount of time, such as about 30 seconds, about 45 seconds, about 60 seconds, about 75 seconds, about 90 seconds, about 105 seconds, or about 120 seconds.

In optional step 210, the aqueous blend may be cooled, such as to about 105° F. to about 130° F., about 105° F. to about 125° F., about 105° F. to about 120° F., about 105° F. to about 115° F., about 110° F. to about 130° F., about 115° F. to about 130° F., or about 120° F. to about 130° F. In some implementations, the oil blend is cooled to about 110° F. to about 120° F., or to about 115° F. Cooling may be performed by circulating, through a jacket of the vessel, water having a temperature less than the temperature of the aqueous blend at the end of step 208. When step 210 is included in the method 200, it may help to reduce or prevent protein denaturation and/or lessen the demand on equipment in downstream steps.

With reference to FIG. 3, a method 300 of preparing a butter spread from an oil fraction and a separate aqueous fraction includes a step 304 of adding the aqueous fraction to the oil fraction with agitation; a step 306 to mixing the aqueous fraction and oil fraction to form an emulsion; a first stage or step 308 of reducing the temperature of (cooling) the emulsion; a second stage or step 312 of reducing the temperature of (cooling) the emulsion; a step 314 of packaging the butter spread; and a step 316 of storing the butter spread. In some embodiments, the method 300 includes one or more of a step 302 of cooling the oil fraction and/or aqueous fraction; a step 310 of mixing the cooled emulsion; and a step 318 of re-melting the cooled emulsion and returning it to the vessel.

In step 304, the aqueous fraction is slowly transferred into the vessel containing the oil fraction. The vessel may be the same vessel in which the oil fraction was prepared by method 200 or the oil fraction may have been transferred to a new vessel. The aqueous fraction may be transferred with agitation, which may be fast agitation, such as sweep agitation and/or counter rotating center agitation. Agitation may help maintain the emulsion as a water-in-oil emulsion and may help avoid phase inversion to an oil-in-water emulsion.

The oil fraction may be combined with the aqueous fraction at a ratio of about 5:1 to about 8:1, about 5:1 to about 7.5:1, about 5:1 to about 7:1, about 5:1 to about 6.5:1, about 5:1 to about 6:1, about 5.5:1 to about 8:1, about 6:1 to about 8:1, about 6.5:1 to about 8:1, about 7:1 to about 8:1, about 6:1 to about 7:1, or about 6.37:1.

With continued reference to FIG. 3, in step 306, the oil fraction and aqueous fraction may be mixed to form a blend, which may be an emulsion. The fractions may be mixed for about 3 minutes to about 15 minutes, about 3 minutes to about 12 minutes, about 3 minutes to about 9 minutes, about 3 minutes to about 6 minutes, about 6 minutes to about 15 minutes, about 9 minutes to about 15 minutes, about 12 minutes to about 15 minutes, or about 5 minutes to about 10 minutes. In implementations of method 100 in which optional step 120 is performed and/or in implementations of method 200 in which optional step 210 is performed, the temperature of the emulsion may be maintained during mixing in step 306 at about 105° F. to about 130° F., about 105° F. to about 125° F., about 105° F. to about 120° F., about 105° F. to about 115° F., about 110° F. to about 130° F., about 115° F. to about 130° F., about 120° F. to about 130° F., about 110° F. to about 120° F., or about 115° F. Alternatively, in implementations of method 100 in which optional step 120 is not performed and/or in implementations of method 200 in which optional step 210 is not performed, the temperature of the emulsion may be maintained during mixing in step 306 at about 130° F. to about 155° F., about 130° F. to about 150° F., about 130° F. to about 145° F., about 130° F. to about 140° F., about 135° F. to about 155° F., about 140° F. to about 155° F., or about 145° F. to about 155° F.

In optional step 302, the blend of the oil fraction and the aqueous fraction is cooled. For example, if optional step 120 at the end of method 100 is not performed, and/or optional step 210 at the end of method 200 is not performed, the blend may need to be cooled. The blend may be at a temperature of about 130° F. to about 155° F., as described immediately above. The blend may be cooled to about 105° F. to about 130° F., about 105° F. to about 125° F., about 105° F. to about 120° F., about 105° F. to about 115° F., about 110° F. to about 130° F., about 115° F. to about 130° F., about 120° F. to about 130° F., about 110° F. to about 120° F., or about 115° F.

In step 308, the temperature of the emulsion may be reduced in a first heat exchanger, which may be a scraped surface heat exchanger (SSHE). The temperature may be reduced to about 52° F. to about 70° F., about 52° F. to about 68° F., about 52° F. to about 66° F., about 52° F. to about 64° F., about 52° F. to about 62° F., about 52° F. to about 60° F., about 52° F. to about 58° F., about 52° F. to about 56° F., about 54° F. to about 70° F., about 56° F. to about 70° F., about 58° F. to about 70° F., about 60° F. to about 70° F., about 62° F. to about 70° F., about 64° F. to about 70° F., about 66° F. to about 70° F., about 58° F., or about 56° F.

In step 308, the temperature of the emulsion may be reduced by about 35° F. to about 95° F., about 35° F. to about 85° F., about 35° F. to about 75° F., about 35° F. to about 65° F., about 35° F. to about 55° F., about 35° F. to about 45° F., about 45° F. to about 95° F., about 55° F. to about 95° F., about 65° F. to about 95° F., about 75° F. to about 95° F., about 85° F. to about 95° F., about 45° F. to about 65° F., or by about 55° F.

The first heat exchanger may be operated at about 200 RPM to about 375 RPM, about 200 RPM to about 350 RPM, about 200 RPM to about 325 RPM, about 200 RPM to about 300 RPM, about 200 RPM to about 275 RPM, about 200 RPM to about 250 RPM, about 225 RPM to about 375 RPM, about 250 RPM to about 375 RPM, about 275 RPM to about 375 RPM, about 300 RPM to about 375 RPM, about 325 RPM to about 375 RPM, about 250 RPM to about 350 RPM, or about 220 to about 250 RPM.

An SSHE may provide one or more of high heat exchange, uniform heat exchange, mixing, and agitation. Optimized cooling curves and/or the speed at which the SSHE is operated may assist with crystal formation, and/or may contribute to the butter spread's overall structure, performance, and ability to withstand temperature cycling. The cooling process may help to produce a butter spread with a desirable creamy texture and consistency.

In optional step 310, the emulsion passes through a mixer, which may be a pin mixer or paddle mixer. The emulsion may be maintained at about 52° F. to about 70° F., about 52° F. to about 68° F., about 52° F. to about 66° F., about 52° F. to about 64° F., about 52° F. to about 62° F., about 52° F. to about 60° F., about 52° F. to about 58° F., about 52° F. to about 56° F., about 54° F. to about 70° F., about 56° F. to about 70° F., about 58° F. to about 70° F., about 60° F. to about 70° F., about 62° F. to about 70° F., about 64° F. to about 70° F., about 66° F. to about 70° F., about 58° F., or about 56° F.

The pin mixer may be operated at about 50 RPM to about 300 RPM, about 50 RPM to about 275 RPM, about 50 RPM to about 250 RPM, about 50 RPM to about 225 RPM, about 50 RPM to about 200 RPM, about 50 RPM to about 175 RPM, about 50 RPM to about 150 RPM, about 50 RPM to about 125 RPM, about 50 RPM to about 100 RPM, about 75 RPM to about 300 RPM, about 100 RPM to about 300 RPM, about 150 RPM to about 300 RPM, about 175 RPM to about 300 RPM, about 200 RPM to about 300 RPM, about 225 RPM to about 300 RPM, about 250 RPM to about 300 RPM, or about 75 RPM to about 125 RPM. Optimal mixer RPMs may assist with crystal formation, and/or may contribute to the butter spread's overall structure, performance, and ability to withstand temperature cycling. Optimal mixer RPMs may also contribute to the butter spread's overall texture, such as by helping to produce a softer spread, or one having a lower vane score, than in the absence of using a pin mixer.

With continued reference to FIG. 3, in step 312, the temperature of the emulsion may be reduced in a second heat exchanger, which may be a SSHE. The temperature may be reduced to about 30° F. to about 50° F., about 30° F. to about 45° F., about 30° F. to about 40° F., about 30° F. to about 35° F., about 35° F. to about 50° F., about 40° F. to about 50° F., about 45° F. to about 50° F., about 32° F. to about 48° F., or about 34° F. to about 38° F.

In step 312, the temperature of the emulsion may be reduced by about 5° F. to about 45° F., about 5° F. to about 35° F., about 5° F. to about 25° F., about 5° F. to about 15° F., about 15° F. to about 45° F., about 25° F. to about 45° F., about 35° F. to about 45° F., or by about 10° F. to about 35° F.

The second heat exchanger may be operated at about 200 RPM to about 375 RPM, about 200 RPM to about 350 RPM, about 200 RPM to about 325 RPM, about 200 RPM to about 300 RPM, about 200 RPM to about 275 RPM, about 200 RPM to about 250 RPM, about 225 RPM to about 375 RPM, about 250 RPM to about 375 RPM, about 275 RPM to about 375 RPM, about 300 RPM to about 375 RPM, about 325 RPM to about 375 RPM, about 250 RPM to about 350 RPM, or about 220 to about 250 RPM.

An SSHE may provide one or more of high heat exchange, uniform heat exchange, mixing, and agitation. Optimized cooling curves and/or the speed at which the SSHE is operated may assist with crystal formation, and/or may contribute to the butter spread's overall structure, performance, and ability to withstand temperature cycling. The cooling process may help to produce a butter spread with a desirable creamy texture and consistency.

In some embodiments, the emulsion is continuously agitated or mixed during method 300 prior to the step 314 of packaging the butter spread. Continuous agitation may assist with crystal formation, and/or may contribute to the butter spread's overall structure, performance, and ability to withstand temperature cycling.

In step 314, the butter spread is packaged, such as in squeezable package.

With continued reference to FIG. 3, in step 316, the butter spread is stored under refrigerated conditions, such as about 32° F. to about 40° F., about 32° F. to about 38° F., about 32° F. to about 36° F., about 34° F. to about 40° F., about 36° F. to about 40° F., or about 33° F. to about 38° F.

In optional step 318, a portion of the butter spread is heated and returned to the vessel in which the aqueous fraction is added to the oil fraction. The portion may be about 5% to about 15% of the butter spread or about 10%. When step 318 is not included in the method 300, the cooling portion of the method 300, such as steps 310 and 312, operates as a batch process. When step 318 is included, the cooling portion of the method 300 operates as a continuous process.

The methods 100, 200, 300 may not include a concentration step, of either an individual component or of a combination of components. The methods 100, 200, 300 may not include an ultrafiltration step, of either an individual component or of a combination of components. The methods 100, 200, 300 may not include a step of phase inversion, such as from a water-in-oil emulsion to an oil-in-water emulsion or vice versa, of either an individual component or a combination of components. The methods 100, 200, 300 may not include a step of homogenization, whether to effect phase inversion or not.

Figure 4:
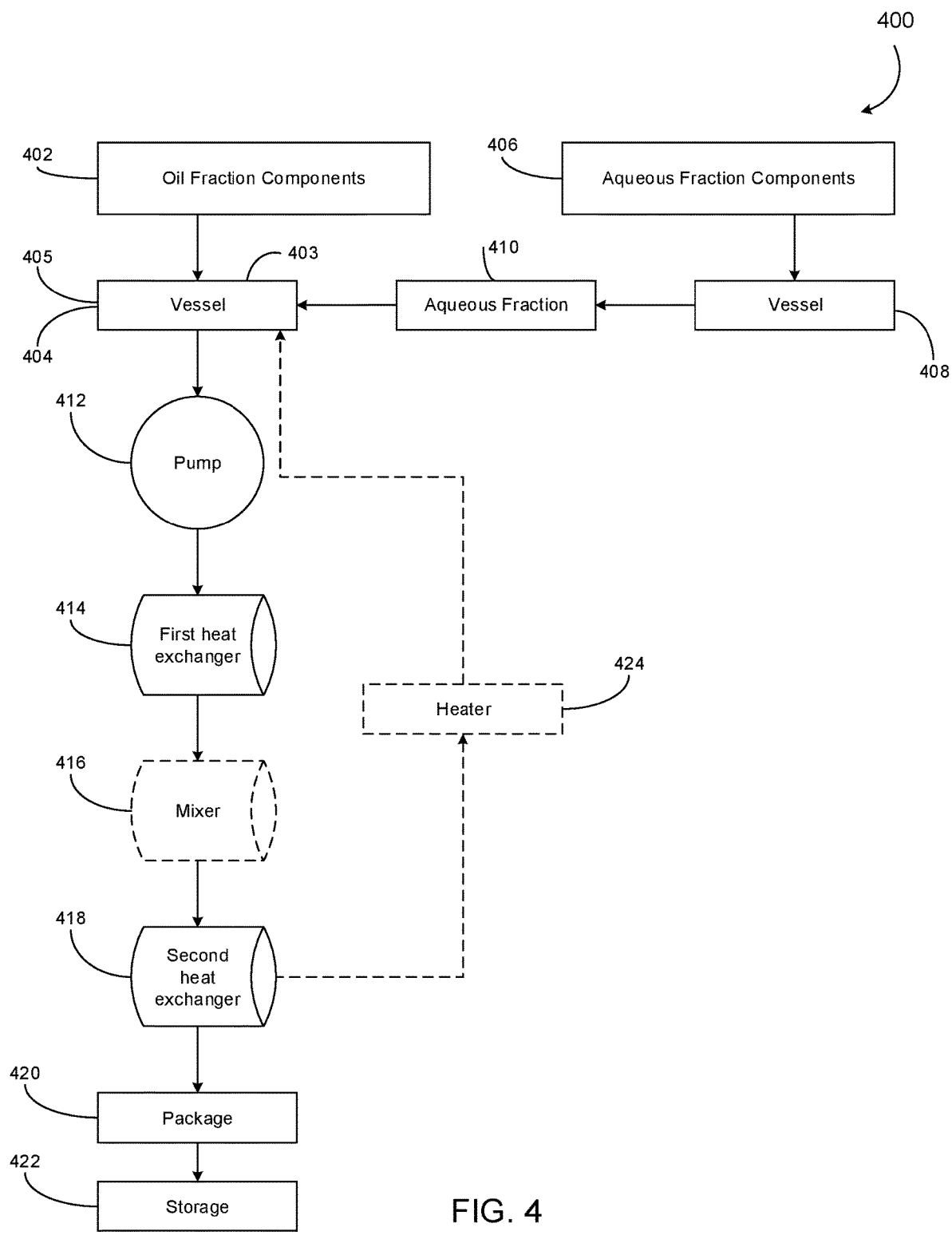
FIG. 4 is a schematic of a butter spread preparation system according to one embodiment.

With reference to FIG. 4, a system 400 for producing a butter spread includes oil fraction components 402; a vessel 404 for receiving the oil fraction components 402; aqueous fraction components 406; a vessel 408 for receiving the aqueous fraction components 406; an aqueous fraction 410; a pump 412 for pumping a blend 405 or emulsion of the oil fraction 403 and the aqueous fraction 410 into a first heat exchanger 414; a second heat exchanger 418; at least one package 420; and a storage 422 location. The system 400 may include either or both of a mixer 416 and a heater 424.

The oil fraction components 402 may include a vegetable oil, an emulsifier, a texturizer, and butter. Each of the oil, emulsifier, texturizer, and butter may be as described above for the butter spreads formulations.

The vessel 404 for receiving the oil phase components 402 may be a tank or kettle. The vessel 404 may include a water jacket for temperature regulation. The oil fraction 403 is formed in the vessel 404, such as according to method 100 described above. The vessel may receive the aqueous fraction 410. The blend 405 of the oil fraction 403 and the aqueous fraction 410 may be produced in the vessel 404 such as described for step 306 above.

The aqueous phase components 406 may include water, dried milk products, preservatives, and flavoring agents. Each of the water, dried milk products, preservatives, and flavoring agents may be as described above for the butter spreads formulations.

The vessel 408 for receiving the aqueous phase components 406 may be a tank or kettle. The vessel 408 may include a water jacket for temperature regulation. The aqueous fraction 410 is produced in the vessel 408, such as by method 200 described above, and is then transferred to vessel 404 to be combined with the oil fraction 403 to form a blend 405 or emulsion.

The first heat exchanger 414 may be a scraped surface heat exchanger (SSHE). The heat exchanger cools the blend 405 of the oil fraction 403 and the aqueous fraction 410 to a desired temperature, such as described for step 308 above.

The optional mixer 416 may be a pin mixer or paddle mixer. The mixer may operate as described for step 310 above.

The second heat exchanger 418 may be a scraped surface heat exchanger. The heat exchanger cools the blend 405 of the oil fraction 403 the aqueous fraction 410 to a desired temperature, such as described for step 312 above.

The package 420 may be squeezable package.

The storage 422 may be refrigerated storage such as described above for step 316.

The system 400 optionally includes a heater 424 for other device for warming or re-melting a portion of the cooled emulsion from the second heat exchanger 418. The cooled emulsion is returned to the vessel 404 for continued processing through at least the pump 412, first heat exchanger 414, and second heat exchanger 418.

Including and using the heater 424 may help the system 400 operate smoothly and efficiently with limited waste because the first and second heat exchangers 414, 416 may exhibit improved performance under continuous operating conditions rather than batch processing conditions.

The methods 100, 200, 300, systems 400, and butter spread formulations described herein may work together to produce butter spread products that maintain their desirable flavors, textures, consistencies, squeezability, and spreadability during repeated product handling and repeated cycling between refrigeration and ambient temperatures. For example, a texturizer (such as palm oil) in combination with a vegetable oil (such as canola oil) and milkfat (such as from butter and/or cream) may assist formation of a desired crystal structure in the emulsion and/or may decrease or prevent excess oil from separating from a butter spread over time. A combination of the texturizer and the single pass cooling of steps 308 and 312 may produce a butter spread with an improved crystal structure and decreased oil separation compared to the formulation alone or the method alone.

As another example, a combination of high milkfat levels and a slow rate of cooling may help produce a squeezable product.

EXAMPLES

The following examples illustrate various aspects of the disclosure and should not be considered limiting.

Example 1—VRT Stability Test

Butter spread samples were packaged in plastic squeeze bottles and were subjected to Variable Refrigerant Temperature (VRT) testing in a controlled environmental chamber for 8 rounds. In each round, the chamber cycled between a refrigerated temperature (45° F.) for 2 hours and a warm ambient temperature (85° F.) for 40 minutes. Each cycle simulated a consumer taking a butter spread out of a refrigerator, letting the spread warm up, and then returning the spread to the refrigerator. A passing sample is one that does not exhibit any oil separation. A failing sample is one in which oil has separated such that it is visible in the bottle.

All samples prepared according to methods 100, 200, or 300, described above, passed the VRT test. Samples that included texturizer at less than 0.5 weight percent of a butter spread and/or were not cooled according to method 300 described above failed the VRT test.

Example 2—Spreadability and Squeezability Test

Vane scores (or yield stress) are a measure of spreadability of a product and were employed as a proxy for squeezability of butter spreads. In the vane method, the amount of torque necessary to rotate a vane through a butter spread is evaluated.

Typical vane scores for butter are about 25,000 to about 30,000. Typical vane scores for a spreadable butter with canola oil are about 8,000 to about 10,000. A squeezable product is one with a vane score of less than 3,000, such as about 800 to about 2,200.

Samples of butter spreads having 11.6%, 13.6% or 16.0% milkfat were tested over 6 months to determine if the vane scores changed over time. The samples (39° F.-40° F.) were tested using a Brookfield R/S Plus rheometer having a 20 mm×6 mm vane spindle (AMETEK® Brookfield, Middleboro, MA). The test ran for 25 seconds while the vane rotated in the samples at 0.2 RPM. Twenty data points were collected during the test and peak stress (in Pascals (Pa)) measurements are presented in Table 1.

TABLE 1

Vanes Scores of Butter Spreads over Time

| | Age of Butter Spread | | | |
|---|---|---|---|---|
| % Milkfat | 2 weeks | 4 months | 5 months | 6 months |
| 11.6 | 1000 | 900 | 800 | 1100 |
| 13.6 | 2100 | 2100 | 2000 | 2300 |
| 16.0 | 3300 | 3300 | 3200 | 3400 |

As demonstrated by the data in Table 1, all butter spread samples were spreadable (vane score<10,000) at all time points. Butter spreads having 11.6% or 13.6% milkfat were squeezable (vane score<3000) at all time points. These butter spreads have sufficient viscosity to be packaged in and applied by a squeeze bottle or similar package.

The vane scores of all butter spread samples remained consistent over time. This data indicates that the disclosed butter spreads do not significantly soften or firm over time.

Example 3—Water Droplet Size Testing

Water droplet size influences microbiological safety because the growth of microorganisms is delayed when the water droplets in which they live are so small that the amount of nutrients per droplet is insufficient to support growth. Conversely, larger water droplets may have sufficient nutrient density to support microbial growth. Smaller (<10 μm) water droplet size enhances food safety and help prevent product spoilage.

Water droplet size of butter spreads prepared according to the methods 100, 200, 300 described above was tested according to the method described in van Duynhoven, J. P. M. "Scope of Droplet Size Measurements in Food Emulsions by Pulsed Field Gradient NMR at Low Field," Magnetic Resonance in Chemistry (2002) 40:S51-S59 using a Bruker mq series NMR analyzer (Billerica, MA). The spreads consistently exhibited water droplet sizes of <10 μm, such as about 8 μm. These results demonstrate that the spreads are safe to consume and do not spoil quickly.

Example 4—Viscosity

Viscosity of the butter spreads was tested as a proxy for squeezability. Samples of butter spreads (39° F.-40° F.) were tested using a Brookfield DV3TRV rheometer with a helipath accessory and a #96 T-bar spindle (AMETEK® Brookfield, Middleboro, MA). The test ran for 30 seconds while the vane rotated in the samples at 5 RPM. Data was collected during the final 15 seconds and average viscosity (in centipoise (cP)) was calculated.

Butter spreads had a viscosity of 500,000 cP to 1,800,000 cP.

Although the present disclosure provides references to preferred embodiments, persons skilled in the art will recognize that changes may be made in form and detail without departing from the spirit and scope of the invention.

What is claimed is:

1. A squeezable, spreadable food product comprising:
   canola oil present at about 42 weight percent to about 56 weight percent of the food product;
   palm oil present at greater than 0.5 weight percent of the food product;
   butter present at about 7 weight percent to about 18 weight percent of the food product;
   cream present at about 2 weight percent to about 15 weight percent of the food product;
   buttermilk powder present at about 0.2 weight percent to about 2.0 weight percent of the food product; and
   an emulsifier present at about 0.25 weight percent to about 0.45 weight percent of the food product,
   wherein the food product has a vane score of about 400 to about 3000.

2. The food product of claim 1, wherein the canola oil comprises high oleic liquid canola oil.

3. The food product of claim 1, wherein the palm oil comprises non-hydrogenated palm oil.

4. The food product of claim 1, wherein the emulsifier comprises distilled monoglyceride.

5. The food product of claim 1, further comprising salt present at about 1.0 weight percent to about 2.2 weight percent of the food product.

6. The food product of claim 1, further comprising potassium sorbate present at about 0.01 weight percent to about 0.20 weight percent of the food product.

7. The food product of claim 1, further comprising lactic acid present at about 0.25 weight percent to about 0.35 weight percent of the food product.

8. The food product of claim 1, further comprising at least one of a flavoring agent and a coloring agent.

9. The food product of claim 1, wherein the food product is free of partially hydrogenated oil.

10. The food product of claim 1, wherein the food product is free of polyglycerol esters of fatty acids (PGFAs).

11. A squeezable, spreadable food product comprising:
    canola oil present at about 42 weight percent to about 56 weight percent of the food product;
    palm oil present at greater than 0.5 weight percent of the food product;
    butter present at less than about 7 weight percent of the food product;
    liquid cream present at about 1 weight percent to about 40 weight percent of the food product;
    buttermilk powder present at about 0.2 weight percent to about 2.0 weight percent of the food product; and
    an emulsifier present at about 0.25 weight percent to about 0.45 weight percent of the food product,
    wherein the food product has a vane score of about 400 to about 3000, and
    wherein the food product has a pH of about 5.0 to about 6.0.

12. The food product of claim 11, wherein the canola oil comprises high oleic liquid canola oil.

13. The food product of claim 11, wherein the palm oil comprises non-hydrogenated palm oil.

14. The food product of claim 11, wherein the emulsifier comprises distilled monoglyceride.

15. The food product of claim 1, further comprising salt present at about 1.0 weight percent to about 2.2 weight percent of the food product.

16. The food product of claim 11, further comprising potassium sorbate present at about 0.01 weight percent to about 0.20 weight percent of the food product.

17. The food product of claim 11, further comprising lactic acid present at about 0.25 weight percent to about 0.35 weight percent of the food product.

18. The food product of claim 11, further comprising at least one of a flavoring agent and a coloring agent.

19. The food product of claim 11, wherein the food product is free of partially hydrogenated oil.

20. The food product of claim 11, wherein the food product is free of PGFAs.

\* \* \* \* \*